Feb. 21, 1939.　　C. A. NERACHER ET AL　　2,147,750
POWER TRANSMISSION
Filed June 11, 1936　　3 Sheets-Sheet 1
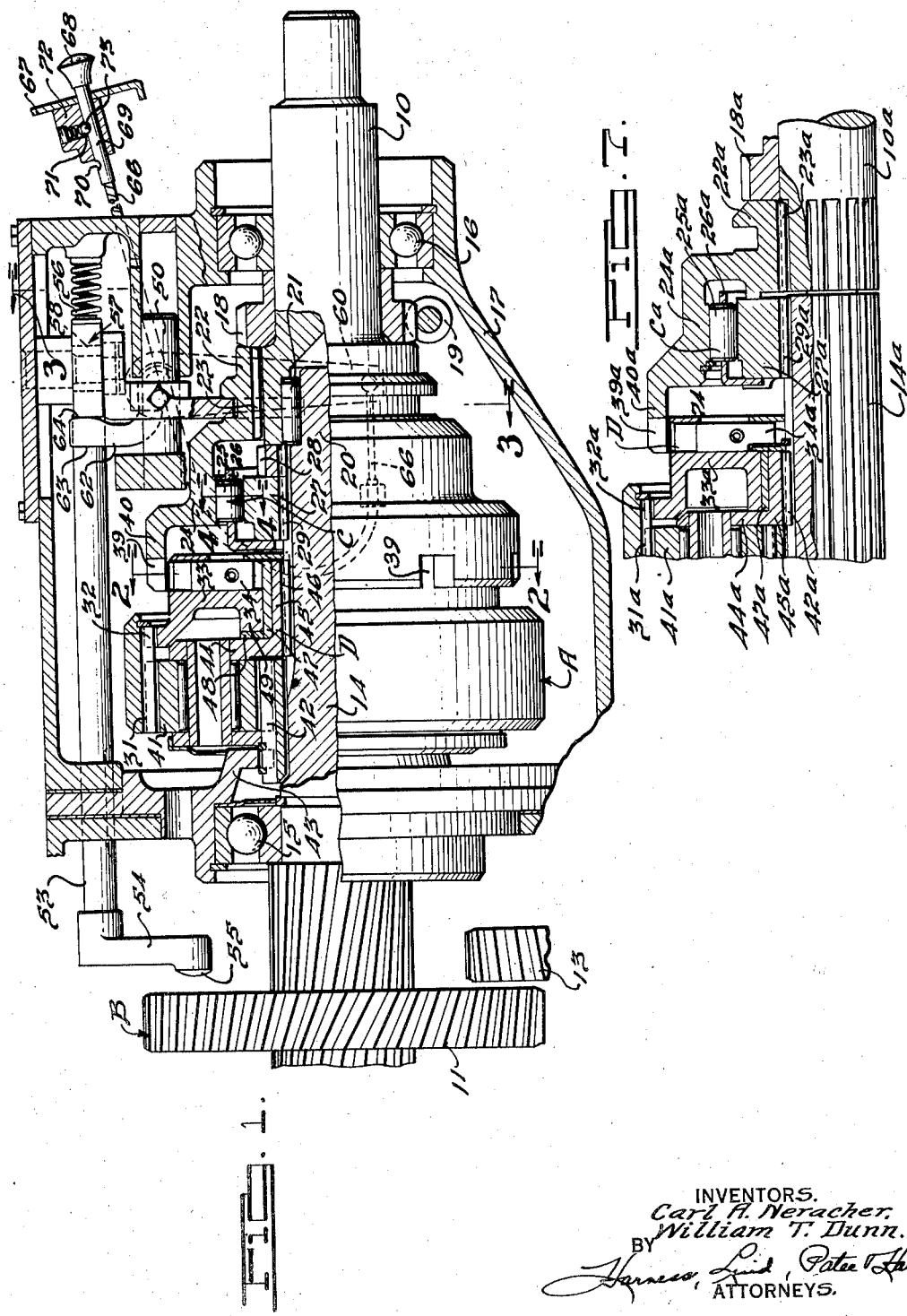
INVENTORS.
Carl A. Neracher.
William T. Dunn.
BY
ATTORNEYS.

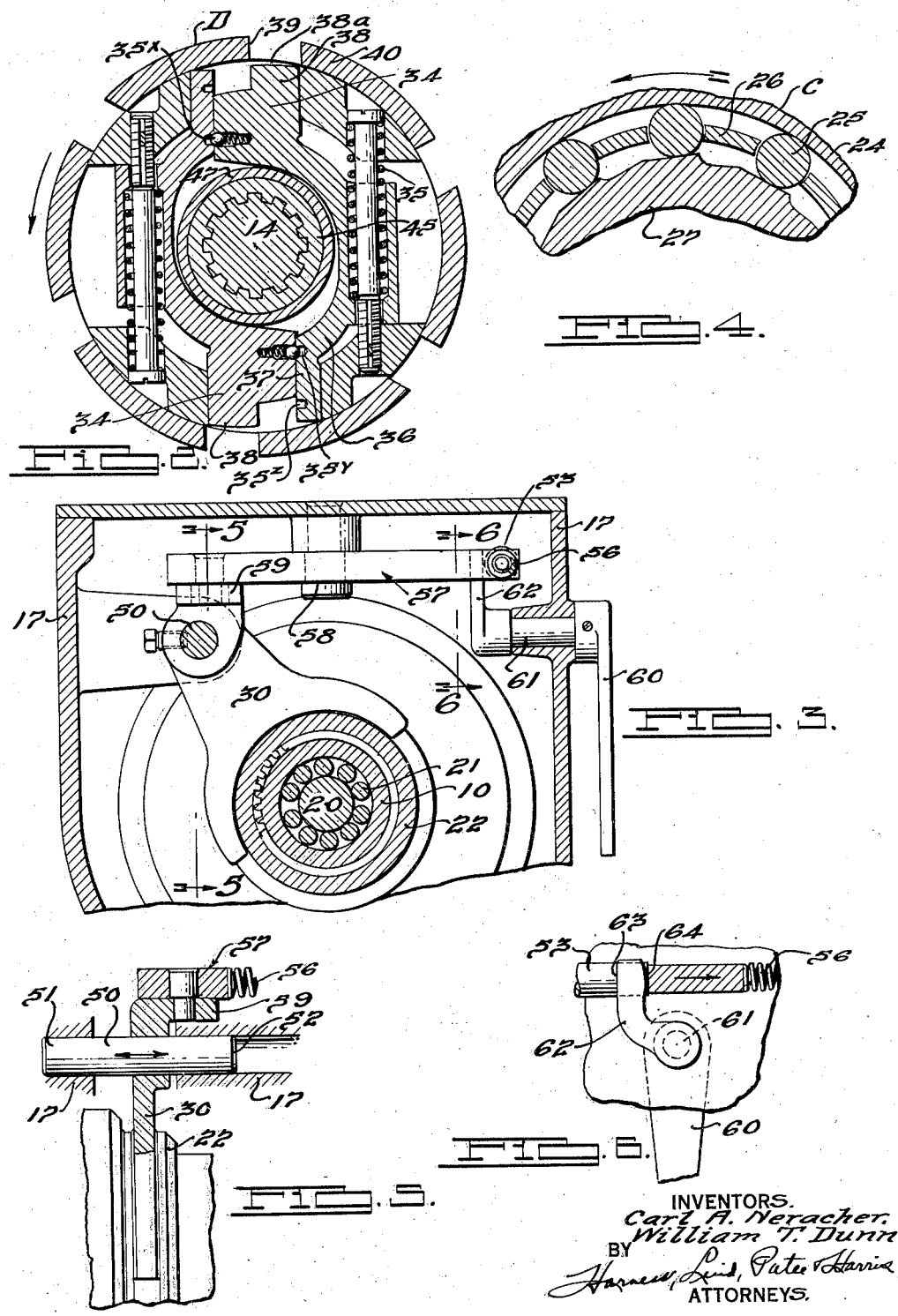

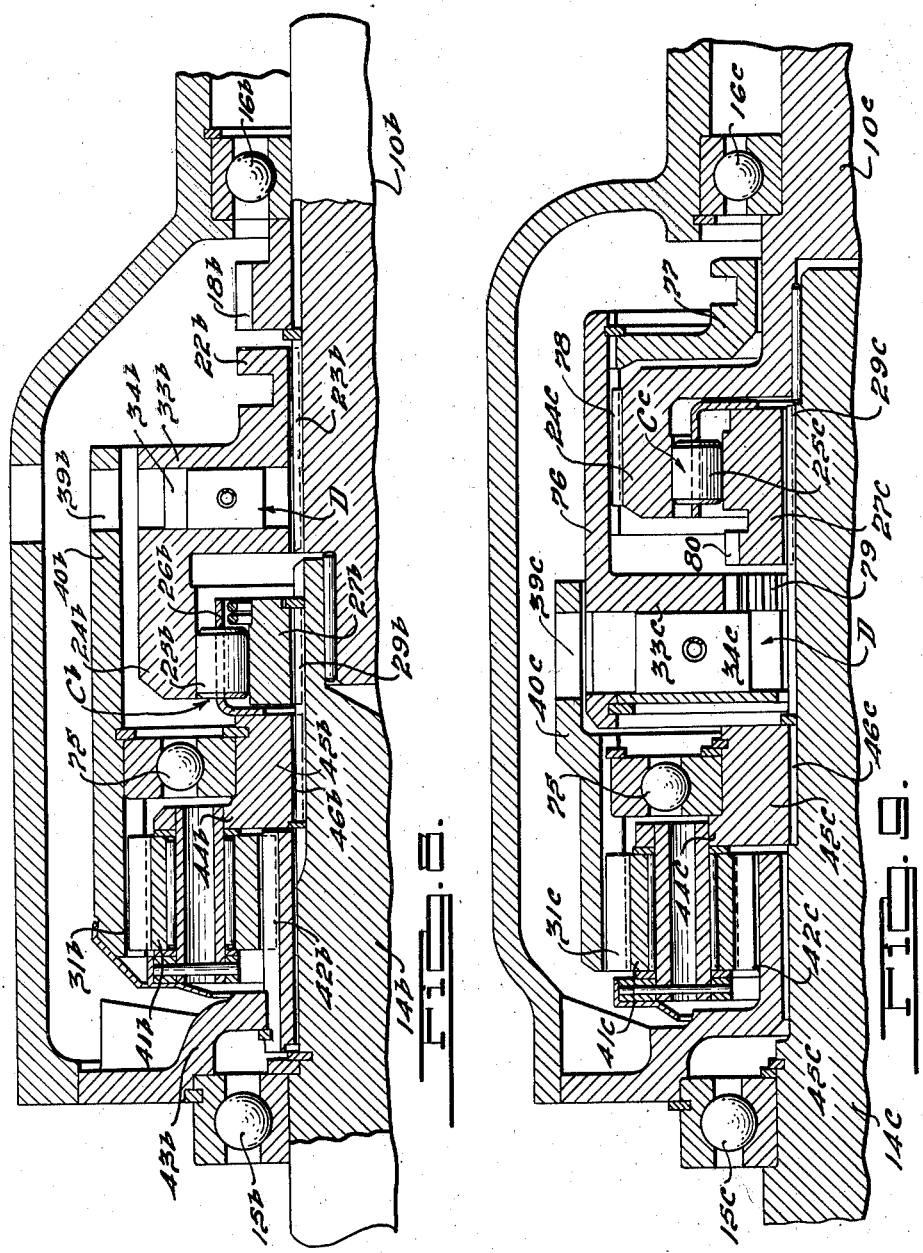

Patented Feb. 21, 1939

2,147,750

UNITED STATES PATENT OFFICE

2,147,750

POWER TRANSMISSION

Carl A. Neracher and William T. Dunn, Detroit, Mich., assignors to Chrysler Corporation, Highland Park, Mich., a corporation of Delaware Application June 11, 1936, Serial No. 84,603

33 Claims. (Cl. 74—260)

This invention relates to power transmissions and refers more particularly to improvements in speed ratio changing mechanism especially adapted for use in driving motor vehicles.

One object of our invention is to provide an improved speed ratio changing mechanism preferably providing an overdrive, or a speed greater than 1 to 1 between driving and driven shafts in the transmission of power from the engine to the vehicle ground wheels.

More particularly, further objects of our invention are to provide a mechanism of the character aforesaid having improved characteristics of long life, quietness of operation, automatic response to the vehicle travel, and relatively low manufacturing cost.

Another object of our invention is to provide an automatic overdrive mechanism between driving and driven shafts incorporating an overrunning clutch action between the shafts during the normal drive and wherein this overrunning action readily synchronizes the relative movement of the elements of the automatic clutch at or above a predetermined speed of rotation of one of its clutching members, after which time this overrunning action ceases.

A further object of our invention is to provide an improved arrangement of both planetary gearing for the overdrive gear train and other movable parts whereby the annulus of the planetary gear train may be considerably reduced in diameter, resulting in a very compact, quiet, and simply constructed overdrive unit.

Further features of our invention reside in an improved means for controlling the operation of the overdrive unit whereby the automatic clutch and the overrunning clutch may be simultaneously rendered inoperative and the centrifugal force operated element is prevented from moving toward its clutching position. We have provided a system of controls for locking out the overrunning clutch by either manually actuating a suitable control or by shifting the conventional speed ratio changing mechanism into reverse; also a novel control and arrangement of parts for positively preventing a direct drive when the automatic clutch is in operation to establish the overdrive.

Additional objects of our invention reside in the provision of a novel overdrive mechanism preferably employing planetary gearing and an overrunning direct drive clutch wherein one member of the overrunning clutch, preferably the outer member, is shifted in locking out the overrunning clutch and axially separating the normal alignment of the automatic overdrive clutch structures. As an alternative arrangement, we have provided for shifting both members of the overrunning clutch as a unit, or in maintaining the overrunning clutch members fixed against movement and providing a separate shift sleeve splined on the outer overrunning clutch member. In the latter instance, the shift sleeve preferably also carries one of the automatic overdrive clutch structures and the lock-out teeth and shifter groove are arranged closely toward the axis of rotation to facilitate clutching action and minimize rubbing speeds as will presently be more apparent.

Further objects and advantages of our invention will be more apparent from the following detailed description of several illustrative embodiments of our invention, reference being had to the accompanying drawings, in which:

Fig. 1 is a sectional elevational view of our overdriving mechanism with a portion of the casing broken away to show the details of its construction.

Fig. 2 is a transverse sectional elevational view taken approximately as indicated by the line 2—2 of Fig. 1.

Fig. 3 is a partial transverse sectional elevational view taken approximately as indicated by the line 3—3 in Fig. 1.

Fig. 4 is a detail sectional view taken as indicated by the line 4—4 of Fig. 1.

Figs. 5 and 6 are detail sectional views taken as indicated by lines 5—5 and 6—6 respectively of Fig. 3.

Figs. 7, 8 and 9 are partial sectional elevational views corresponding to Fig. 1 but illustrating modified forms of our overdriving mechanism.

Referring to the drawings, we have illustrated our overdriving mechanism A interposed between a speed ratio changing transmission B and a driven shaft 10, the latter extending rearwardly to drive the rear wheels (not shown) of the motor car or vehicle in the usual well-known manner, it being understood that we have elected to show our invention in association with a motor vehicle drive although in its broader aspects it is not necessarily limited thereto.

Furthermore, our driving mechanism may be used to advantage at various other points in the line of general power transmission between the vehicle engine and the driven wheels, or between driving or driven means, such as shafts of other types of devices.

The transmission B may be of any suitable type, such as the conventional selector type operated in the well-known manner through usual selector controls whereby the various adjustments may be made to the transmission in order to provide speed ratios including reverse, in the line of drive through the transmission.

Inasmuch as transmission B may, for the most part, be of general conventional construction and operation, we have shown only a portion of the gearing of this transmission in Fig. 1 wherein 11 represents a low speed and reverse gear adapted to be shifted by the usual reverse selector control rearwardly or to the right, as viewed in Fig. 1, for engagement with the usual reverse idler 13 in order to effect a reverse drive from the normal direction of drive to the driven shaft 10. This idler gear 13 constantly meshes with the usual countershaft reverse gear (not shown). Thus, by appropriate actuation of the usual transmission controls, gears 11 and 13 may be engaged to reverse the drive, it being understood that other manipulations of the transmission mechanism are adapted to selectively produce other desired speed ratio changes in the normal direction of rotation for driven shaft 10.

The power coming from the usual engine or prime mover (not shown) which may be located forwardly of transmission B, drives the transmission and the power is taken from this transmission by a power driving means or shaft 14.

In Fig. 1 the driving shaft 14 is suitably journaled, one bearing therefor being shown at 15, while driven shaft 10 is rotatably journaled by a bearing 16 mounted in a casing 17, the usual speedometer drive being taken from shaft 10 by gearing 18 and 19 in a well-known manner. The driven shaft 10 pilots the rearward end 20 of the driving shaft 14 which is centered therein by a bearing 21.

A shiftable clutch 22 is slidably mounted on one of the shafts, such as shaft 10, and is continuously drivingly connected with said shaft by teeth 23. This clutch 22 is preferably formed integral with a cylindrical driven member 24 of the overrunning clutch C, the latter having rollers or cylinders 25 which are maintained in their properly spaced relationship by a spacer ring 26 and a driving cam member 27. In this instance, this cam member 27 is fixed against axial shifting and is driven from shaft 14 by splines 29 thereof. Clutch teeth 28 are also driven with shaft 14 and are engageable with teeth 23 of shiftable clutch 22 when the latter is moved forwardly by a shifter fork 30 to lock out the overrunning clutch and other parts of the mechanism, as will be hereinafter more apparent.

An annulus gear 31 of the planetary gear train for convenience may be formed with rearwardly extending internal teeth 32 for carrying a rearwardly extending pawl cage 33 incorporating one or more pawls 34 of an automatic clutch D.

This automatic clutch may be of the type wherein the pawls 34 are yieldingly urged inwardly to their disengaged or declutched positions by springs 35. If desired, each pawl 34 may be provided with a spring actuated ball detent 35$^x$ releasably engaging either of recesses 35$^y$ or 35$^z$ to assist in holding the pawls in stabilized condition and to prevent hunting prior to their release for outward and inward clutching movement respectively. At a predetermined desired speed of rotation of the pawls, centrifugal force will cause outward movement of the pawls, overcoming the action of springs 35, whereby the pawls will be projected for engaged or clutched positions. Each pawl 34 may have a yoke portion 36 extending substantially around shaft 14 and terminating in a counterbalancing guide end portion 37 substantially diametrically opposite a clutching end portion 38 of each pawl.

Slots 39 of a cylindrical shell 40, formed as a forward extension of the cylindrical driven member 24, are so arranged in Fig. 1 that the slots 39 will telescope the pawl cage 33.

Pawl cage 33 is thus driven by the annulus gear 31 having planet gears 41 meshing with a sun gear 42, in this case fixed by brackets 43 to the casing 17. The planet gears 41 are supported by a carrier 44 having a rearwardly extending sleeve portion 45 which is drivingly connected at 46 to driving shaft 14. A bearing 47 surrounds the sleeve portion 45 and rotatably supports the pawl cage 33, while a bearing 48 may be interposed between a hub portion 49 of the pawl cage 33 and the planet carrier 44 to accommodate any thrust which might be present; i. e., if helical planetary gearing is used. The forward end of the shell 40 may be rotatably centered on cage 33.

The planetary gear set is thus adapted at all times to rotate the pawl cage 33 from and at a speed greater than that of the driving shaft 14, whereas the slots 39 of the shell 40 are driven, when pawls 34 are positioned as shown in Figs. 1 and 2, directly from the driven shaft 10. With clutch 22 positioned as shown, shaft 14 drives shaft 10 through the overrunning clutch C until, at or above the critical speed, pawls 34 are projected outwardly for engagement with slots 39, and such engagement will occur when the slots and pawls are substantially synchronized.

Synchronization is effected by decreasing the speed of the driving shaft, as by releasing the usual accelerator pedal and allowing the driven shaft 10 to overrun the driving shaft 14 by reason of the overrunning clutch C. After projection of pawls 34, while the drive is directly through the overrunning clutch, and during the overrunning action to attain synchronism, the pawl ends 38 "jump" the slots 39 assisted by their cam faces 38$^a$ so that the pawls cannot engage the slots until their speeds are substantially the same.

When automatic clutch D engages for providing a two-way positive drive through the planetary gear train, the overrunning clutch C is ineffective and continues to be so until the pawls are retracted by reason of their rotation below the critical speed.

Means for shifting clutch 22 forwardly has been provided by shifter fork 30 being fixed to a horizontal rod 50 having both ends 51 and 52 slidably supported by extensions of casing 17. A horizontal shaft 53 is slidably supported in casing 17, an extension 54 of shaft 53 having a lower face 55 in the path of action of the slidable low speed and reverse gear 11. Shaft 53 is yieldingly urged forwardly to its Fig. 1 position by a spring 56, whenever gear 11 is not engaged for reverse drive and whenever a dash control—to be described later—is not actuated. The rearwardly extending portion of shaft 53 is secured to one end of a lever arm 57 which is pivotally supported at 58 by casing 17. The other end of arm 57 is attached to an extension 59 of shifter fork 30.

Further means for shifting clutch 22 has been incorporated which is independent of the aforementioned reverse gear control. An arm 60 is mounted on a shaft 61 extending rotatably through casing 17, the lower face of the arm 60 engaging a suitable remote control, in our drawings a Bowden wire dash control, the details of which will be presently set forth. The portion of the shaft 61 inside the casing 17 has an actuating arm 62 attached thereto which is slidably attached at 63 to shaft 53, at stop 64 on shaft 53 allowing its actuation rearwardly by arm 62 only when the low speed and reverse gear 11 and the shaft 53 are in their normal positions, as shown in Fig. 1.

Lockout of the automatic clutch D is effected by forward movement of slots 39 and actuated by forwardly shifting movement of clutch 22. When these slots are projected forwardly, they are out of position for engagement by the pawls 34 of the automatic clutch D, the shell 40 then closely surrounding the outer ends of the pawls, thereby preventing outward movement of the pawls 34 toward their clutching positions. Spring 56 tends to return the slots 39 to their normal position of Fig. 1 following along with the rearwardly shifting movement of clutch 22.

Forwardly shifting of clutch 22 is effected when gear 11 is moved to reverse drive position. The lower face 55 of extension 54 extends into the path of movement of the gear 11 when the latter is moved rearwardly for engagement with reverse idler gear 13, as aforesaid. The arrangement is such that when the gear 11 is shifted into engagement with gear 13 for establishing the reverse drive, providing the mechanism is set to properly effect reverse, as will be presently apparent, extension 54 will be engaged toward the latter part of the movement of gear 11 to move shaft 53 rearwardly or to the right. Such movement actuates the lever arm 57 to shift clutch 22 forwardly to mesh teeth 23 and 28 to lock out or render inoperative the overrunning clutch C and the automatic clutch D, thereby providing a two-way direct drive between shafts 14 and 10. During the aforesaid movement of shaft 53, spring 56 will be compressed so that on release or forward movement of gear 11, the parts will be restored to positions thereof illustrated; provided, however, that other controls for the shiftable parts are positioned to accommodate such return movement as will be presently apparent.

In addition to the aforesaid manually operated means for shifting position clutch 22 forwardly in response to a setting of the reverse gearing of the transmission B, we have also provided a further manually controlled means for shifting the clutch 22, at times when permitted by our improved controlling means, independently of the movement thereof under the influence of the reverse setting of the transmission. To this end a Bowden wire 66, as diagrammatically illustrated, extends forwardly from arm 60 for convenient manipulation by the vehicle driver, such position being indicated by the usual dash 67 which mounts a handle or knob 68 connected to the other end of the Bowden wire 66. The handle is adapted for movement by the hand of the vehicle driver, this handle being guided from its position illustrated to a position in spaced relationship from dash 67, in which position a guide portion 69 registers a notch 70 thereof with a spring pressed ball 71 carried by a guide block 72. The ball 71 and the notches 70 and 73 engageable therewith cooperate to advise the operator of the proper positioning of handle 68 for effecting the desired movement of the shifter fork 30 and clutch 22. In Fig. 1 it will be noted that the ball 71 is illustrated in engagement with the notch 73 and in this position spring 56 is acting to move clutch 22 rearwardly to maintain it in the position shown. In this position the teeth 23 are in driving engagement solely with the driven shaft 10.

It will be noted that when handle 68 is pulled outwardly from the dash 67, the arm 62 will move rearwardly against the stop 64 on shaft 53, which movement, through lever arm 57, will cause clutch 22 to move forwardly, this shifting movement of clutch 22 under actuation of handle 68 being independent of a similar shifting movement under the influence of reverse gear 11. When the clutch 22 is shifted forwardly by engagement of notch 70 with ball 71, the clutch device will be maintained in the aforesaid shifted position until the handle 68 is restored to the position illustrated.

When clutch 22 including the pawl slots 39, and the controls are as illustrated, the driving shaft 14 drives the driven shaft 10 through the members 27 and 24 of the overrunning clutch C, the drive passing from cylindrical member 24 to the clutch 22. However, when the automatic clutch D is engaged, by momentarily slowing down the speed of the driving shaft to synchronize the speeds of the slots and pawls, the drive between the driving shaft 14 and the driven shaft 10 will be accomplished with an overdrive action or increase in speed of the driven shaft over the driving shaft through planet carrier 44, planet gears 41, annulus gear 31, automatic clutch D, shell 40, and clutch 22.

When the automatic clutch D is engaged for the overdrive, it is impossible to shift clutch 22 forwardly or to the left of the position shown to attempt lock-out of the overrunning and automatic clutches for a direct drive, as the pawls 34 will be engaged with slots 39 of the shell 40.

Our mechanism thus provides safety controls protecting teeth 23, 28 when the overdrive is engaged; also protecting the pawls and slots and preventing their "ratcheting" action when driving directly through teeth 28, 23 above the critical speed of the automatic clutch.

In Fig. 7 we have illustrated a somewhat modified arrangement of parts, primarily differing from the Fig. 1 construction in that both parts of the overrunning clutch Cª are shifted as a unit in response to actuation of shifter fork 30 for rendering the overrunning clutch Cª and the automatic clutch D inoperative. Reference numerals primed "a" have been used to indicate parts of similar function.

In this modified arrangement, it is apparent that the rollers or cylinders 25ª and the driving cam member 27ª are locked against the shiftable clutch 22ª by a locking ring 74.

The operation of the mechanism illustrated in Fig. 7 is substantially the same as in the foregoing embodiment of our invention, the same controlling means being adaptable. Thus, with the parts positioned as illustrated in the drawings, the driving shaft 14ª drives the driven shaft 10ª through the members 27ª and 24ª of the overrunning clutch Cª, the drive passing from cylindrical member 24ª to the clutch 22ª. However, when the automatic clutch D is engaged, the drive between the driving shaft 14ª and the driven shaft 10ª will be accomplished with an overdrive action or increase in speed of the driven shaft over the driving shaft through planet carrier 44ª, planet gears 41ª, annulus gear 31ª, automatic clutch D, shell 40ª, and clutch 22ª.

When the clutch 22ª is shifted forwardly by actuation of the aforedescribed dash or reverse gear controls, the teeth 23ª of clutch 22ª will mesh with the splines 29ª of the driving shaft 14ᵃ to lock out the overrunning clutch Cᵃ and the automatic clutch D, thereby providing a two-way direct drive between shafts 14ᵃ and 10ᵃ. During this shifting of clutch 22ᵃ, the entire overrunning clutch slides forwardly on splines 29ᵃ, slots 39ᵃ being moved beyond registration with the pawls of clutch D as in Fig. 1.

Referring to Fig. 8 in which we have shown another arrangement of parts somewhat modified from that in Fig. 1, reference numerals primed "b" have been used to indicate parts of similar function.

In this modified arrangement, it is evident that this differs primarily from the Fig. 1 construction in that the pawl cage 33ᵇ and the pawls 34ᵇ are carried by the shiftable clutch 22ᵇ on the driven shaft 10ᵇ through teeth 23ᵇ. Furthermore, the shell 40ᵇ carrying the slots 39ᵇ is formed on the rearwardly extending portion of the annulus gear 31ᵇ. A bearing 75 is provided between the sleeve portion 45ᵇ of planet carrier 44ᵇ and the rearwardly extending portion of annulus gear 31ᵇ to support the latter and to take thrust arising from helical planetary gears.

The operation of the mechanism illustrated in Fig. 8 is substantially the same as in the foregoing embodiments of our invention, the same controlling means being adaptable. When the parts are positioned as illustrated in the drawings, the driving shaft 14ᵇ will drive the driven shaft 10ᵇ through the members 27ᵇ and 24ᵇ of the overrunning clutch Cᵇ, the drive passing through cylindrical member 24ᵇ, cage 33ᵇ, and clutch 22ᵇ. However, when the automatic clutch D is engaged under predetermined conditions as earlier described, the drive between the driving shaft 14ᵇ and the driven shaft 10ᵇ will be accomplished with an overdrive action or increase in speed of the driven shaft over the driving shaft through the intermediary of planet carrier 44ᵇ, planet gears 41ᵇ, annulus gear 31ᵇ, automatic clutch D, and clutch 22ᵇ.

When the clutch 22ᵇ is shifted forwardly by actuation of the earlier described dash or reverse gear controls, the teeth 23ᵇ of cage 33ᵇ will mesh with the splines 29ᵇ of the driving shaft 14ᵇ to render the overrunning and automatic clutches Cᵇ and D, respectively, simultaneously inoperative, thereby providing a two-way direct drive between shafts 14ᵇ and 10ᵇ. In this case the pawls 34ᵇ are shifted out of registration with slots 39ᵇ.

In Fig. 9 we have illustrated still another somewhat modified arrangement of parts, primarily differing from the Fig. 1 construction (reference numerals primed "c" have been used to indicate parts of similar function) in that the pawl cage 33ᶜ including pawls 34ᶜ are carried by a shifting member 76 attached to a shifter member 77 rotatably supported on the driven shaft 10ᶜ. The shifting member 76 is splined at 78 for shifting across the outer free wheel member 24ᶜ, both members of the overrunning clutch Cᶜ being stationary as regards any fore and aft control shifting. A toothed clutching member 79 is formed on the rearwardly extending portion of cage 33ᶜ and when shifted rearwardly the clutching member 79 meshes with another toothed clutching member 80. The clutching members 79 and 80, and shifter member 77 are preferably brought in as close as possible to the axis of rotation, as shown, to respectively effect easy meshing of the clutch teeth 79, 80 and to reduce the rubbing speeds at shifter 77.

The rearwardly extending portion of the annulus gear 31ᶜ has formed thereon the shell 40ᶜ carrying slots 39ᶜ. If desired, as a variation, the shifting member 76 may carry the shell 40ᶜ and slots 39ᶜ, and the annulus gear 31ᶜ may carry the pawl cage 33ᶜ and pawls 34ᶜ.

The operation of the mechanism illustrated in Fig. 9 is substantially the same as in the foregoing embodiments of our invention, it being evident that the use of a shifting member splined to the periphery of the outer free wheel member may be incorporated, if desired, to eliminate the control shifting of any member of the overrunning clutch. Thus, with the parts positioned as illustrated, the driving shaft 14ᶜ drives the driven shaft 10ᶜ through members 27ᶜ and 24ᶜ of the overrunning clutch Cᶜ, the cylindrical member 24ᶜ in this instance being integral with the driven shaft. However, when the automatic clutch D is engaged under the earlier described conditions, the drive between the driving shaft 14ᶜ and the driven shaft 10ᶜ will be effected with an overdrive action or increase in speed of the driven shaft over the drive shaft through planet carrier 44ᶜ, planet gears 41ᶜ, annulus gear 31ᶜ, automatic clutch D, shifting member 76, and cylindrical member 24ᶜ.

When the shifter member is moved rearwardly by the aforesaid controls, the shifting member 76 and the cage 33ᶜ will be actuated as a unit to engage clutch member 79 with its cooperating clutch member 80, thereby locking out of the overrunning clutch C and the automatic clutch D will be effected to provide a two-way direct drive between shafts 14ᶜ and 10ᶜ, the drive passing therebetween through the intermediary of cam 27ᶜ, pawl cage 33ᶜ, shifting member 76 and cylindrical member 24ᶜ.

We furthermore do not limit our invention in the broader aspects thereof to any part, combination, and arrangement of parts such as shown and described for illustrative purposes since various modifications will be apparent from the teachings of our invention and scope thereof as defined in the appended claims.

We claim:

1. In a drive for a motor vehicle having a power driving shaft and a shaft driven therefrom and adapted to drive said vehicle, overdriving means including planetary gearing between said shafts for driving said driven shaft at a speed greater than the speed of the driving shaft, said planetary gearing including a plurality of gear elements one of which is an annulus gear element, means providing a non-releasable drive connection between said driving shaft and another gear element of said planetary gearing, a speed responsive clutch controlling said overdriving means, said clutch including clutching structures respectively drivingly connected to the driven shaft and to the annulus gear element of said planetary gearing, said clutch being adapted to automatically connect said shafts through said planetary gearing, and means for shifting one of said clutching structures relative to the other to render the overdrive inoperative.

2. In a drive for a motor vehicle having a power driving shaft and a shaft driven therefrom and adapted to drive said vehicle, overdriving means including planetary gearing between said shafts for driving said driven shaft at a speed greater than the speed of the driving shaft, said planetary gearing including a plurality of gear elements one of which is an annulus gear element and another of which is a planetary gear element having a carrier therefor, means providing a continuous driving connection between said driving shaft and the carrier for said planetary gear element, a speed responsive clutch controlling said overdriving means, said clutch including clutching structures respectively drivingly connected to the driven shaft and to the annulus gear element of said planetary gearing, said clutch being adapted to automatically connect said shafts through said planetary gearing in response to a predetermined speed of rotation of at least one of said shafts, and means for shifting one of said clutching structures relative to the other to render the overdrive inoperative.

3. In a drive for a motor vehicle having a power driving shaft and a shaft driven therefrom and adapted to drive said vehicle, overdriving means including planetary gearing between said shafts for driving said driven shaft at a speed greater than the speed of the driving shaft, said planetary gearing including a sun gear, an annulus gear, and a planetary gear meshing with said sun and annulus gears, said planetary gearing further including a carrier mounting said planetary gear, and a speed responsive clutch controlling said overdriving means, said clutch including clutching structures respectively drivingly connected to the driven shaft and to the annulus gear of said planetary gearing, said clutching structure which is drivingly connected to said annulus gearing being movable by centrifugal force into positive clutching engagement with the other said clutching structure to automatically connect said shafts through said planetary gearing, means providing a non-releasable drive connection between said driving shaft and said planetary gear carrier, and means for holding said sun gear against rotation whereby said planetary gear will drive said annulus gear at a speed faster than that of said driving shaft.

4. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including planetary gearing between said shafts for driving said driven shaft at a speed greater than the speed of the driving shaft, said planetary gearing including an annulus gear, a clutch controlling said overdriving means and comprising clutching structures respectively drivingly connected to said driven shaft and to the annulus gear of said planetary gearing, said clutch being adapted to automatically connect said shafts through said overdriving means and the planetary gearing thereof in response to a predetermined speed of rotation of at least one of said shafts, a set of clutch teeth drivingly connected to said driving shaft, and manually operable means for drivingly connecting said shafts for a two-way drive therebetween for locking out said overrunning clutch and comprising a second set of clutch teeth drivingly connected to said driven shaft and shiftable to a position of clutching engagement with the first said set of clutch teeth.

5. In a drive for a motor vehicle having a power driving shaft and a shaft driven therefrom and adapted to drive said vehicle, overdriving means including planetary gearing between said shafts for driving said driven shaft at a speed greater than the speed of the driving shaft, said planetary gearing including an annulus gear, and a speed responsive clutch controlling said overdriving means, said clutch including clutching structures respectively drivingly connected to the driven shaft and to the annulus gear of said planetary gearing, said clutching structure which is drivingly connected to said annulus gear being movable by centrifugal force into positive clutching engagement with the other of said clutching structures to automatically connect said shafts through said planetary gearing, said driving shaft being fixed against movement axially thereof and projecting concentrically within said annulus gear.

6. In a power transmission for a motor vehicle having a power driving shaft and a shaft driven therefrom and adapted to drive the vehicle, said driving and driven shafts being co-axially arranged for relative rotation, means for releasably driving said driven shaft from said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting one of said clutching structures to said driven shaft for rotation at the same speed therewith, and means including planetary gearing having a part thereof drivingly connected to the other of said clutching structures for driving the same from said driving shaft at a speed different from that of the other of said clutching structures when said driving shaft drives said driven shaft through said releasable driving means, said driving shaft having a portion thereof fixed against movement axially thereof and extending concentrically within said cylindrical clutching structure.

7. In a power transmission for a motor vehicle having a power driving shaft and a shaft driven therefrom and adapted to drive the vehicle, said driving and driven shafts being co-axially arranged for relative rotation, means for releasably driving said driven shaft from said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting said cylindrical clutching structure to said driven shaft for rotation at the same speed therewith, and means including planetary gearing having a part thereof drivingly connected to said second clutching structure for driving the same from said driving shaft at a speed greater than that of said driving shaft and said cylindrical clutching structure when said driving shaft drives said driven shaft through said releasable driving means, said driving shaft having a portion thereof fixed against movement axially thereof and extending concentrically within said cylindrical clutching structure, and manually operable means for coupling said driven shaft to said driving shaft portion to provide a two-way direct drive therebetween independently of the drive through said planetary gearing.

8. In a power transmission for a motor vehicle having a power driving shaft and a shaft driven therefrom and adapted to drive the vehicle, said driving and driven shafts being co-axially arranged for relative rotation, means for releasably driving said driven shaft from said driving shaft, a cylindrical clutching structure having a pawl receiving slot, means for mounting said cylindrical clutching structure for rotation concentrically with said shafts, a second clutching structure having a centrifugal force actuated pawl adapted for engagement in said slot to positively couple said clutching structures when the rotational speeds thereof are substantially the same, means for drivingly connecting said second clutching structure to said driven shaft for rotation at the same speed therewith, and means including planetary gearing having a part thereof drivingly connected to said cylindrical clutching structure for continuously driving the same from said driving shaft at a speed greater than that of said driving shaft and said second clutching structure when said driving shaft drives said driven shaft through said releasable driving means, said driving shaft having a portion thereof fixed against movement axially thereof and extending concentrically within said cylindrical clutching structure, and manually operable means for coupling said driven shaft to said driving shaft portion to provide a two-way direct drive therebetween independently of the drive through said planetary gearing.

9. The combination with a driving shaft and a driven shaft, of a planetary gearing for driving said driven shaft at a speed different from that of the driving shaft, and a clutch for connecting one of said shafts with one of the members of the planetary gearing, one of the members of said clutch being connected to one of the gears of said gearing, another member of said clutch being arranged to be drivingly connected to one of said shafts, the members of said clutch being so constructed that engagement will not be effected until the two members approach substantial synchronism, an overrunning clutch including inner and outer clutch elements connected one to said driving shaft and the other to said driven shaft, clutch teeth drivingly connected to each of said shafts, and means for shifting at least one of said clutch members and one of said clutch elements as a unit to engage said clutch teeth for drivingly connecting said shafts for a two-way direct drive therebetween.

10. The combination with a driving shaft and a driven shaft, of a planetary gearing for driving said driven shaft at a speed different from that of the driving shaft, and a clutch for connecting one of said shafts with one of the members of the planetary gearing, one of the members of said clutch being connected to one of the gears of said gearing, another member of said clutch being arranged to be drivingly connected to one of said shafts, the members of said clutch being so constructed that engagement will not be effected until the two members approach substantial synchronism, an overrunning clutch including inner and outer clutch elements connected one to said driving shaft and the other to said driven shaft, clutch teeth drivingly connected to each of said shafts, and means for shifting both of said clutch elements and one of said clutch members as a unit to engage said clutch teeth for drivingly connecting said shafts for a two-way drive therebetween.

11. The combination with a driving shaft and a driven shaft, of a planetary gearing for driving said driven shaft at a speed different from that of the driving shaft, and a clutch for connecting one of said shafts with one of the members of the planetary gearing, one of the members of said clutch being connected to one of the gears of said gearing, another member of said clutch being arranged to be drivingly connected to one of said shafts, the members of said clutch being so constructed that engagement will not be effected until the two members approach substantial synchronism, an overrunning clutch including inner and outer clutch elements connected one to said driving shaft and the other to said driven shaft, a shiftable clutching sleeve splined on said outer clutch element and having a set of clutch teeth, a second set of clutch teeth driven with said inner clutch element, said clutching sleeve drivingly connecting one of said clutch members to said outer clutch element, and means for shifting said clutching sleeve to engage said sets of clutch teeth and simultaneously shifting the last said clutch member relative to the other of said clutch members.

12. In a drive for a motor vehicle having a power driving shaft and a shaft driven therefrom and adapted to drive said vehicle, overdriving means including planetary gearing between said shafts for driving said driven shaft at a speed greater than the speed of the driving shaft, a speed responsive clutch controlling said overdriving means, said clutch including clutching structures respectively adapted for driving connection to said driving and driven shafts at least when said structures are clutched, said clutch being adapted to automatically connect said shafts through said planetary gearing, and means for relatively shifting said clutching structures to prevent their clutching engagement.

13. In a power transmission for a motor vehicle having a power driving shaft and a shaft driven therefrom and adapted to drive the vehicle, means including an overrunning clutch intermediate said shafts for driving said driven shaft from said driving shaft and for releasing said drive when said driven shaft overruns said driving shaft, overdriving means including planetary gearing between said shafts for driving said driven shaft at a speed greater than the speed of the driving shaft, a clutch controlling said overdriving means, said clutch being adapted to automatically connect said shafts through said overdriving means and the planetary gearing thereof in response to a predetermined speed of rotation of at least one of said shafts, and means for simultaneously shifting one of the members of said overrunning clutch and at least one of the members of said automatic clutch to positively couple said shafts for a two-way drive therebetween.

14. In a motor vehicle drive, a rotatable axially fixed driving shaft, a rotatable driven shaft, a sun gear adapted to be held against rotation, an internal gear, a planetary gear meshed with said sun and internal gears, said driving shaft extending concentrically through said sun gear, means for continuously drivingly connecting said planetary gear with said driving shaft, an overrunning clutch including inner and outer clutch members respectively drivingly connected to said driving and driven shafts, a set of clutch teeth driven with each of said shafts, an automatically operating speed responsive clutch including clutching structures respectively connected to said internal gear and to said driven shaft for driving said driven shaft at an overdrive speed from said driving shaft through said planetary and internal gears, and manually controlled means for engaging said sets of clutch teeth.

15. In a motor vehicle drive, a drive shaft, a driven shaft, an overrunning clutch intermediate said shafts, said overrunning clutch including concentrically arranged inner and outer clutching members respectively connected to said driving and driven shafts, a set of clutch teeth drivingly connected to said driving shaft, a shift sleeve splined on the outer overrunning clutch member and having a set of clutch teeth disposed inwardly from the splines of said shift sleeve for engagement with the first said set of teeth, and means for shifting said sleeve.

16. In a motor vehicle drive, a drive shaft, a driven shaft, an overrunning clutch intermediate said shafts, said overrunning clutch including concentrically arranged inner and outer clutching members respectively connected to said driving and driven shafts, a set of clutch teeth drivingly connected to said driving shaft, and a shift sleeve splined on the outer overrunning clutch member and having a set of clutch teeth disposed inwardly from the splines of said shift sleeve for engagement with the first said set of teeth, said shift sleeve having a shifter portion projecting inwardly from the splines of said shift sleeve.

17. In a motor vehicle drive, a drive shaft, a driven shaft, an overrunning clutch intermediate said shafts, said overrunning clutch including concentrically arranged inner and outer clutching members respectively connected to said driving and driven shafts, a set of clutch teeth drivingly connected to said driving shaft, a shift sleeve splined on the outer overrunning clutch member and having a set of clutch teeth disposed for engagement with the first said set of teeth, and overdriving means between said driving shaft and said shift sleeve including a gear train driven from the driving shaft and further including an automatically operating clutch having clutching structures respectively carried by said shift sleeve and an element of said gear train.

18. In a drive for a motor vehicle having axially aligned driving and driven shafts, overdriving means including gearing between said shafts for driving said driven shaft at a speed greater than that of said driving shaft, said overdriving means further including a speed responsive clutch controlling said gearing, said speed responsive clutch comprising clutching structures respectively drivingly connected to an element of said gearing and to said driven shaft, and means for shifting said driven-shaft-connected clutching structure relative to said gearing-connected clutching structure to render said speed responsive clutch inoperative.

19. In a drive for a motor vehicle having axially aligned driving and driven shafts, overdriving means including gearing between said shafts for driving said driven shaft at a speed greater than that of said driving shaft, said overdriving means further including a speed responsive clutch controlling said gearing, said speed responsive clutch comprising clutching structures respectively drivingly connected to an element of said gearing and to said driven shaft, means for shifting said driven-shaft-connected clutching structure relative to said gearing-connected clutching structure to render said speed responsive clutch inoperative, and an overrunning clutch comprising clutch members drivingly connected to said driving and driven shafts, at least one of said overrunning clutch members being displaced axially of said shafts in response to shifting of said driven-shaft-connected clutching structure.

20. In a drive for a motor vehicle having a power driving shaft and a shaft driven therefrom, overdriving means including planetary gearing between said shafts for driving said driven shaft at a speed greater than the speed of the driving shaft, a speed responsive clutch for automatically connecting said shafts through said plentaary gearing and including relatively rotatable clutching structures one of which is slotted and the other of which is movable by centrifugal force to clutch with said slotted clutching structure when the speeds of said clutching structures are approximately synchronized, means drivingly connecting said slotted clutching structure with said driven shaft for rotation at the same speed therewith, said planetary gearing including a planet gear carrier structure adapted for driving connection with said driving shaft and further including an annulus gear, a rotatable cage mounting said movable clutching structure and disposed within said slotted clutching structure prior to clutching of said clutching structures, said cage being driven from said annulus gear for rotating said movable clutching structure faster than said slotted clutching structure prior to clutching of said clutching structures, and means providing a direct drive from said driving shaft to said driven shaft releasable on slowing down the rotational speed of said driving shaft to approximately synchronize said clutching structures as aforesaid.

21. In a motor vehicle drive according to claim 20 wherein, said carrier structure has a portion thereof extending coaxially within said cage to provide a centering support for said cage.

22. In a motor vehicle drive according to claim 20 wherein, a thrust bearing is disposed between said carrier structure and said cage for taking axial thrusts therebetween.

23. In a motor vehicle drive according to claim 20 wherein, manually operable means is provided for axially displacing said slotted clutching structure while maintaining said driving connection thereof with said driven shaft whereby to render said speed responsive clutch inoperative.

24. In a motor vehicle drive according to claim 20, wherein, sets of teeth are respectively drivingly carried with said driving shaft and with said driving-connecting means for said slotted clutching structure, and means for axially displacing said slotted clutching structure while maintaining said driving connection thereof with said driven shaft for simultaneously rendering said speed responsive clutch inoperative and for engaging said sets of clutch teeth to couple said shafts for a two-way drive therebetween.

25. In a motor vehicle drive, the combination with driving and driven shafts, of an overrunning clutch including clutch members respectively adapted for driving connection to said shafts for transmitting a one-way drive therebetween, means including a gear train for drivingly connecting said shafts around said overrunning clutch, said driving connecting means including a shiftable tooth-carrying member surrounding one of said overrunning clutch members and splined thereto so as to be driven with one of said shafts, additional teeth adapted to be driven with the other of said shafts, and means for shifting said shiftable member to engage the teeth thereof with said additional teeth to connect said shafts for a two-way direct drive therebetween.

26. In a motor vehicle drive, the combination with driving and driven shafts, of an overrunning clutch including clutch members respectively adapted for driving connection to said shafts for transmitting a one-way drive therebetween, means for shifting one of said clutch members relative to the other, a pair of engageable clutch elements, and means including a gear train for drivingly connecting one of said clutch elements with one of said shafts, the other of said clutch elements being drivingly connected to said shiftable clutch member.

27. In a motor vehicle drive, the combination with driving and driven shafts, of an overrunning clutch including clutch members respectively adapted for driving connection to said shafts for transmitting a one-way drive therebetween, a pair of engageable clutch elements, means including a gear train for drivingly connecting one of said clutch elements with one of said shafts, and an axially shiftable sleeve having splined connection with one of said clutch members for drivingly connecting the other of said clutch elements with the other of said shafts.

28. The combination with driving and driven members and an intermediate torque-transmitting member, of mechanism for overdriving said intermediate member from said driving member, and speed-responsive means rotatable with said intermediate member and drivably engageable with the driven member for establishing an overdrive between said driving and driven members.

29. The combination with driving and driven members, of coupling means comprising a centrifugally movable clutch part and a shiftable member adapted to receive said part for drivably coupling said members, means for establishing reverse drive setting for said driving member, and means actuated in response to movement of the last named means for shifting said shiftable member out of receiving relation to said clutch part.

30. The combination with driving and driven members rotatable at a predetermined speed ratio and an intermediate torque-transmitting member rotated at a different speed ratio by said driving member, and speed-responsive means rotatable with said intermediate member and drivably engageable with the driven member for establishing a drive between said driving and driven members, said driven member including intersplined parts, one of which is adapted to drivably engage said speed-responsive means and is shiftable into a position precluding such engagement.

31. The combination with driving and driven members and an intermediate member, driven by one of the aforesaid members, of torque-transmitting means rotatable with said intermediate member, a free wheel clutch having driving and driven parts between said driving and driven members and independent of said means, and a coupling member slidably splined on the driven part of said clutch and movable into and out of cooperative relation to said means.

32. The combination with driving and driven members and an intermediate member driven by one of the aforesaid members at a different speed than said one of the members, of torque-transmitting means rotatable with said intermediate member, a free wheel clutch having driving and driven parts between said driving and driven members and independent of said means, the driven part of said clutch being longitudinally stationary and connected to said driven member, and a coupling member slidably splined on said driven clutch part and movable into and out of cooperative relation to said means.

33. The combination with driving and driven members, of means providing selectively overdrive, free wheel direct and two-way direct drives between said members, and a coupling member independent of the driving member for establishing a driving connection between said driving and driven members through each of said means, said overdrive means including a torque-transmitting speed-responsive element, said coupling member being shiftable out of receiving relation to said element to render the free wheel drive operative and being further shiftable to establish the two-way drive.

CARL A. NERACHER.
WILLIAM T. DUNN.